United States Patent
Takeda et al.

[19]

[11] Patent Number: 6,078,464
[45] Date of Patent: Jun. 20, 2000

[54] DRUM BASE ON WHICH A DRUM OF A MAGNETIC TAPE RECORDER IS MOUNTED

[75] Inventors: Hidekazu Takeda, Hiratsuka; Shinya Fujimori; Kenmei Masuda, both of Yokohama; Atsushi Inoue, Chigasaki; Fukuyasu Abe, Yokohama; Hisashi Ichikawa, Hitachinaka; Masashi Ueda, Hitachinaka; Yoshiharu Yamashita, Hitachinaka; Kazuyuki Kodama, Hitachinaka, all of Japan

[73] Assignee: Hitachi, Ltd., Tokyo, Japan

[21] Appl. No.: 08/622,380

[22] Filed: Mar. 27, 1996

[30] Foreign Application Priority Data

Mar. 28, 1995 [JP] Japan ................................ 7-069576

[51] Int. Cl.$^7$ .................................................... G11B 15/61
[52] U.S. Cl. ..................... 360/84; 360/107; 360/130.24
[58] Field of Search .............................. 360/107, 84–85, 360/130.22–130.24

[56] References Cited

U.S. PATENT DOCUMENTS 4,686,597  8/1987  Johnston ..................... 360/130.24 X
4,761,696  8/1988  Muller et al. .............................. 360/84
4,959,742  9/1990  Tsutsumi ............................. 360/130.23
5,089,921  2/1992  Kodama et al. ...................... 360/85 X
5,459,625  10/1995  Ohshima et al. .................... 360/107 X

FOREIGN PATENT DOCUMENTS

2-254663  10/1989  Japan .

*Primary Examiner*—John H. Wolff
*Attorney, Agent, or Firm*—Antonelli, Terry, Stout, & Kraus, LLP

[57] ABSTRACT

A drum base according to he invention, on which a drum of a magnetic tape recorder is mounted, comprises a substantially annular frame having a fixing surface to which the drum is fixed; at least one through hole extending through the fixing surface for allowing a screw which is to be threadably attached to a threaded hole formed in the drum to pass therethrough; and a pair of mounting surfaces provided on the fixing surface on which the drum is mounted, the mounting surfaces being located adjacent to the at least one through hole so as to have a symmetrical relationship in a circumferential direction of the annular frame with respect to the at least one through hole and within a range of a diameter dimension of the at least one through hole in a radial direction of the annular frame.

12 Claims, 9 Drawing Sheets

DRUM BASE ON WHICH A DRUM OF A MAGNETIC TAPE RECORDER IS MOUNTED

BACKGROUND OF THE INVENTION

The present invention relates to a drum base on which a drum of a magnetic tape recorder such as a VTR and a DAT is mounted.

Figure 1:
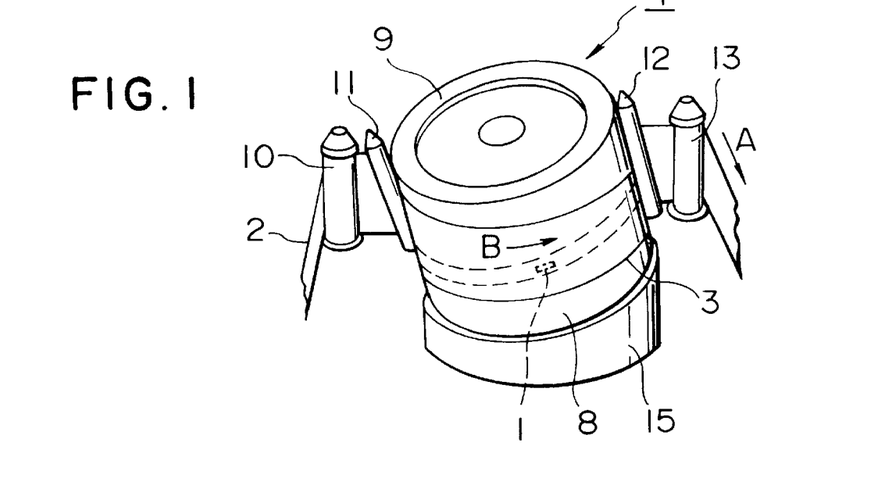
FIG. 1 is a perspective view showing a magnetic tape recorder drum, on which a magnetic tape is wound.
Figure 2:
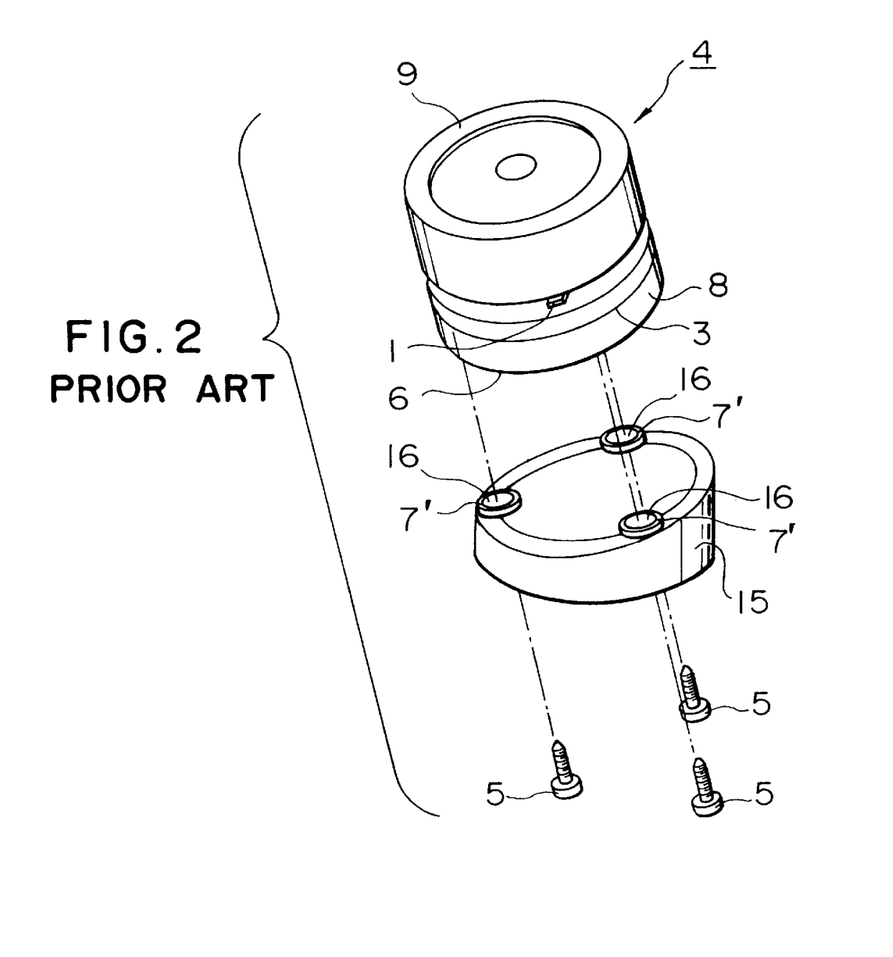
FIG. 2 is an exploded perspective view showing the assembly of the drum and the drum base of a prior art magnetic tape recorder.

As shown in FIGS. 1 and 2 of the accompanying drawings, a drum 4 of a magnetic tape recorder comprises a lower drum 8 and an upper drum 9. The lower drum 8 is mounted on a drum base 15, which is fixed at a predetermined position of a chassis, not shown. The upper drum 9 is rotatably supported coaxially with the lower drum 8. A magnetic tape 2 is obliquely wound on the peripheries of the drum 4 by tape-guides 10, 11, 12, 13. Specifically, the tape 2 is wound on the lower drum 8 and the upper drum 9. The lower edge of the tape 2 is guided by a step 3 called as a lead formed on the surface of the lower drum 8. For normal recording and reproduction, the tape 2 runs at a predetermined speed in the direction shown by an arrow A. A head 1 is projectingly provided through a gap formed between the lower and upper drums 8, outward from drum surfaces by a predetermined amount. The head 1 rotates coaxially with the drum 9 at high speed in the direction shown by an arrow B. A tip of the head 1 obliquely scans the tape 2 to record signals thereon or reproduce the signals recorded on the tape.

Figure 3:
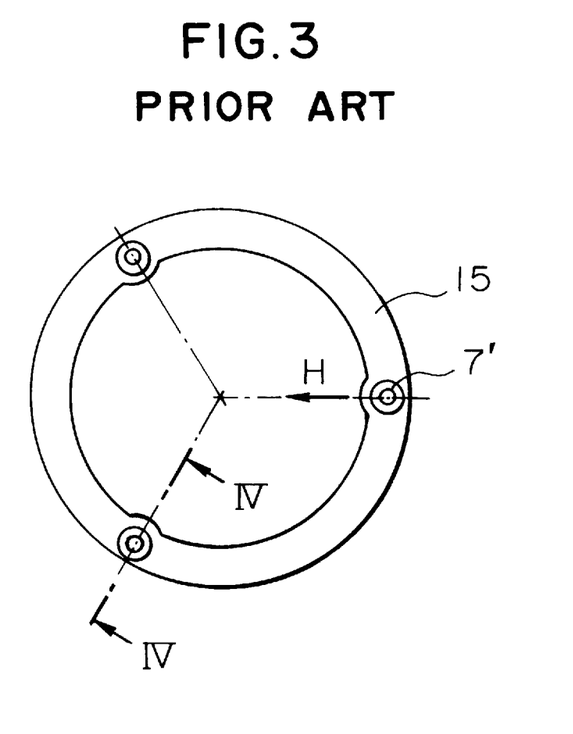
FIG. 3 is a plan view of the drum base of the prior art.
Figure 4:
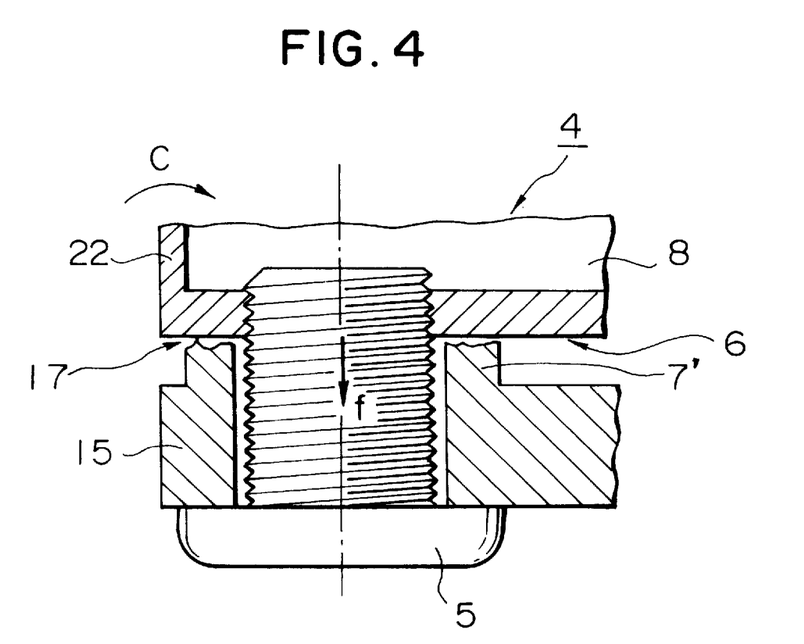
FIG. 4 is an enlarged sectional view taken along line IV—IV of FIG. 3, additionally showing part of the drum.

With reference to FIGS. 2–4, the drum base 15 has three annular drum seats 7' formed on its top and three holes 16 formed through it. Each of the seats 7' is coaxial with one of the holes 16. A bottom 6 of the lower drum 8 rests on the seats 7'. The drum 4 is fixed on the drum base 15 by screws 5, which extend through the holes 16 and the seats 7' and are tightened into the lower drum 8 in the direction shown. The seats 7' are positioned on the same plane, and determine the height, inclination and direction of inclination of the drum 4 by coming into contact with the bottom surface 6 of the lower drum 8.

If the working precision of a drum seat 7' is low, as shown in FIG. 4, a projection 17 may be formed. When the drum 4 is mounted and fixed on the drum seat 7' having such projection 17, the bottom surface 6 of the lower drum 8 cannot come into contact with the whole surface of the drum seat 7' and further as a tightening force f of the screw 5 is applied in the direction shown in FIG. 4, a bending moment, which is the product of the tightening force f multiplied by the distance between the projection 17 and the center of the hole 16, is applied. Meanwhile, as magnetic tape recorder drums have been smaller and more lightweight, they have become thinner and less rigid. As a result, the lower drum 8 is distorted locally inward as shown by an arrow C by the bending moment, so that the lead 3 formed on the lower drum 8 is also distorted.

In the example shown in FIG. 4, the projection 17 is located radially outwardly of the drum base 15 with respect to the associated screw 5. If the projection 17 is located radially inwardly of the drum base 15 with respect to the screw 5, the tightening force f of the screw 5 locally distorts the lower drum 8 radially outwardly of the lower drum 8 (reversely to the arrow C), so that the lead 3 is distorted.

Figure 5A:
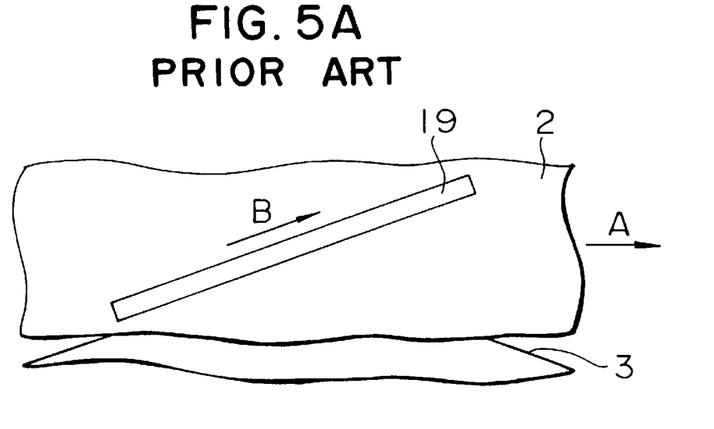
FIG. 5A is a fragmentary view showing a track pattern being recorded on a magnetic tape guided by a distorted drum lead according to the prior art.
Figure 5B:
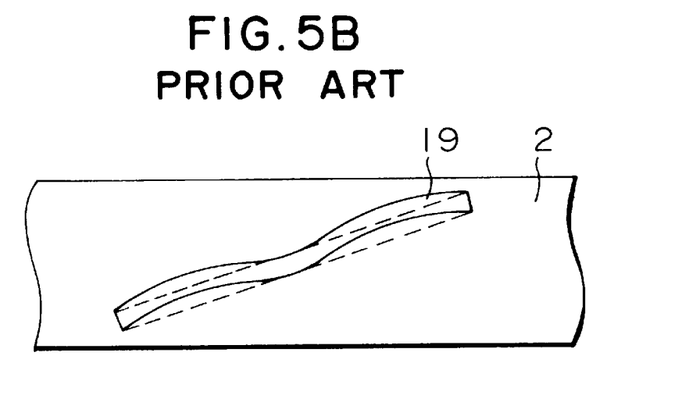
FIG. 5B is a fragmentary view showing a track pattern recorded on a magnetic tape guided by a distorted drum lead according to the prior art.

If the lead 3 is deformed as shown in FIG. 5A, the tape 2 follows the deformation of the lead 3 as it is guided by the lead 3 and as a result, a recording track 19 formed on the tape 2 becomes wavy and less linear as shown in FIG. 5B.

Figure 5C:
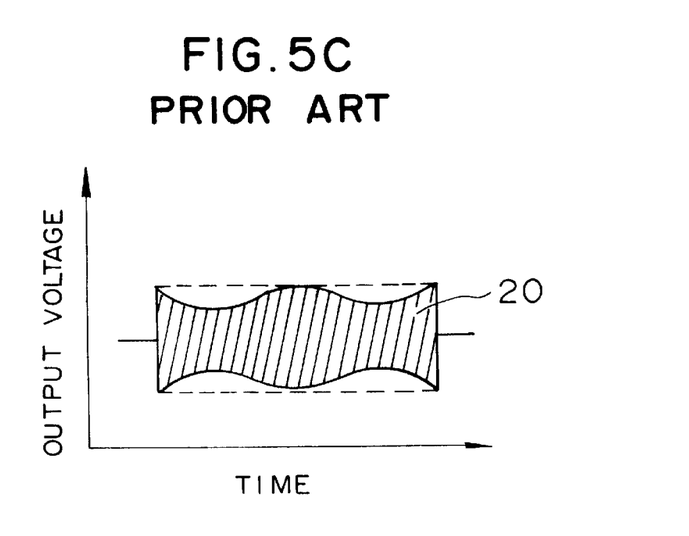
FIG. 5C is a graph showing the reading characteristic of the track pattern shown in FIG. 5B.
Figure 6:
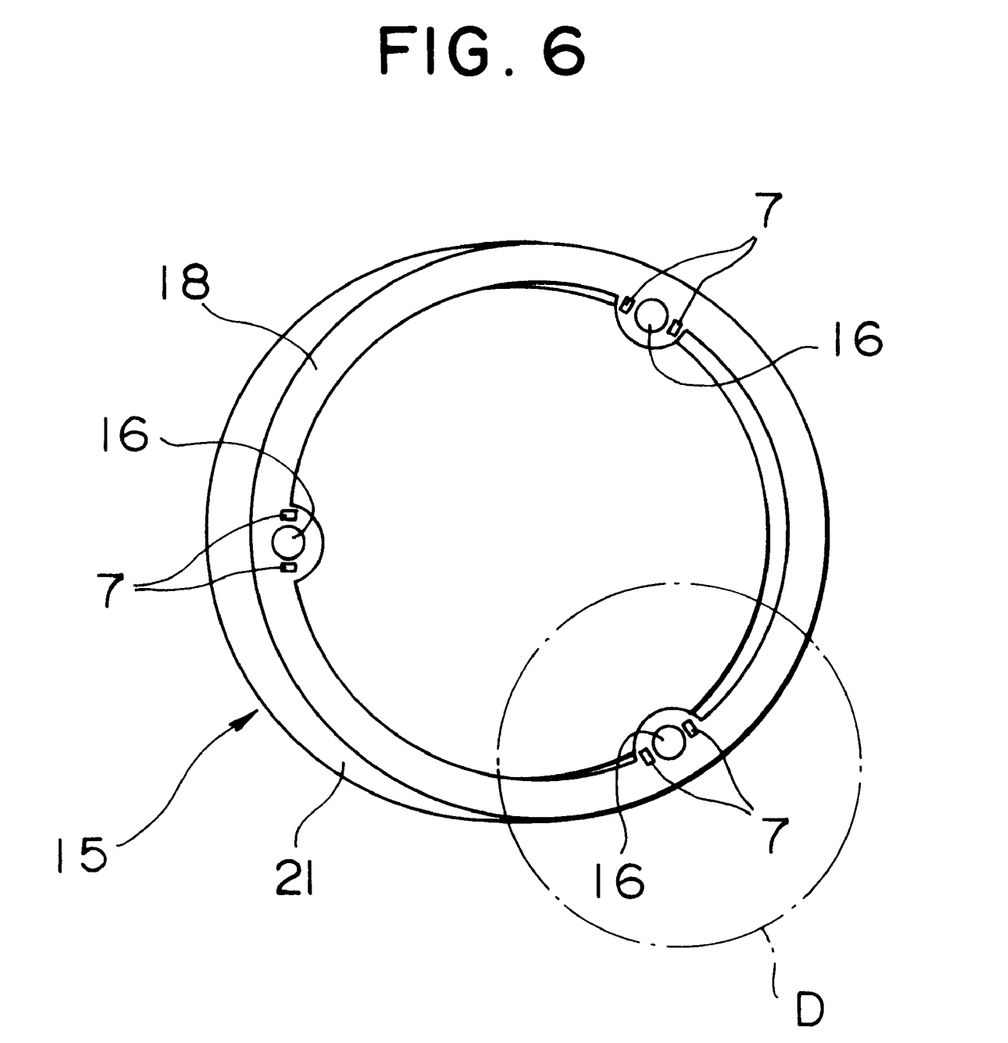
FIG. 6 is a plan view of an embodiment of a drum base, on which a drum of a magnetic tape recorder is mounted, according to the invention.

When a tape on which recording has been made by a recorder with a normal lead is reproduced by a recorder with a deformed lead 3 as shown in FIG. 5A, or when a tape on which recording has been made by a recorder with a deformed lead 3 as shown in FIG. 5A is reproduced by a recorder with a normal lead, the reproduction output of the tracks fluctuates, as shown in FIG. 5C (where the broken lines show normal values). Accordingly, the reproduced wave forms 20 are worse, so that the performance is remarkably low. In addition, under such a condition, part of the signal on an adjacent track may be read, causing cross talk. As a result, the quality of the reproduced signals is remarkably low. Furthermore, the deformation of lead 3 is a factor of unstable tape running or movement, which may prevent signals from being precisely recorded or reproduced.

Japanese Patent Unexamined Publication No. 2-254663 proposes drum base structure for correcting drum deformation. The drum base has seats, and a drum is mounted on the top surfaces of the seats. Each top surface has a linear boundary extending through an axis of an associated hole in the drum base. The extending direction of the boundary is selectively determined so as to correct the drum deformation, when the drum having the drum deformation is mounted on the seats. The publication does not include any disclosure to prevent the drum from being locally deformed when it is fixed to the drum base.

SUMMARY OF THE INVENTION

An object of the present invention is to provide a drum base of a magnetic tape recorder to prevent occurrence of a locally deformation of the drum, that is, a locally deformation of a lead to guide running of the magnetic tape when the drum is mounted on the drum base.

A drum base according to the invention, on which a drum of a magnetic tape recorder is mounted, comprises a substantially annular frame having a fixing surface to which the drum is fixed; at least one through hole extending through the fixing surface for allowing a screw which is to be threadably attached to a threaded hole formed in the drum to pass therethrough; and a pair of mounting surfaces provided on the fixing surface on which the drum is mounted, the mounting surfaces being located adjacent to the at least one through hole so as to have a symmetrical relationship in a circumferential direction of the annular frame with respect to the at least one through hole and within a range of a diameter dimension of the at least one through hole in a radial direction of the annular frame.

It is preferable that the pair of mounting surfaces are located such that first centerlines thereof extending in the circumferential direction of the annular frame are located so as to coincide with a second centerline of the at least one through hole extending in the circumferential direction of the annular frame.

Furthermore, the pair of mounting surfaces may be provided only for one through hole.

As stated above, the pair of mounting surfaces are located near the through hole in symmetrical relationship with respect to the through hole in the circumferential direction of the annular frame. In addition, the pair of mounting surfaces are located within the range of the dimension of the diameter of the through hole in the radial direction of the annular frame. This arrangement reduces a component in the radial direction of a bending moment which may be resulted from the surface irregularity of each mounting surface when the drum is fixed with the screw, and the component which tends to deform the drum locally in the radial direction of the frame. Although another component in the circumferential direction of the bending moment is also resulted which tends to deform the drum locally in the circumferential direction of the frame, the circumferential local deformation of the drum is practically negligible since the rigidity of the drum in the circumferential direction is large. As a result, the drum lead is not locally deformed, so that a good track linearity is obtained.

DESCRIPTION OF THE PREFERRED EMBODIMENTS

Figure 7:
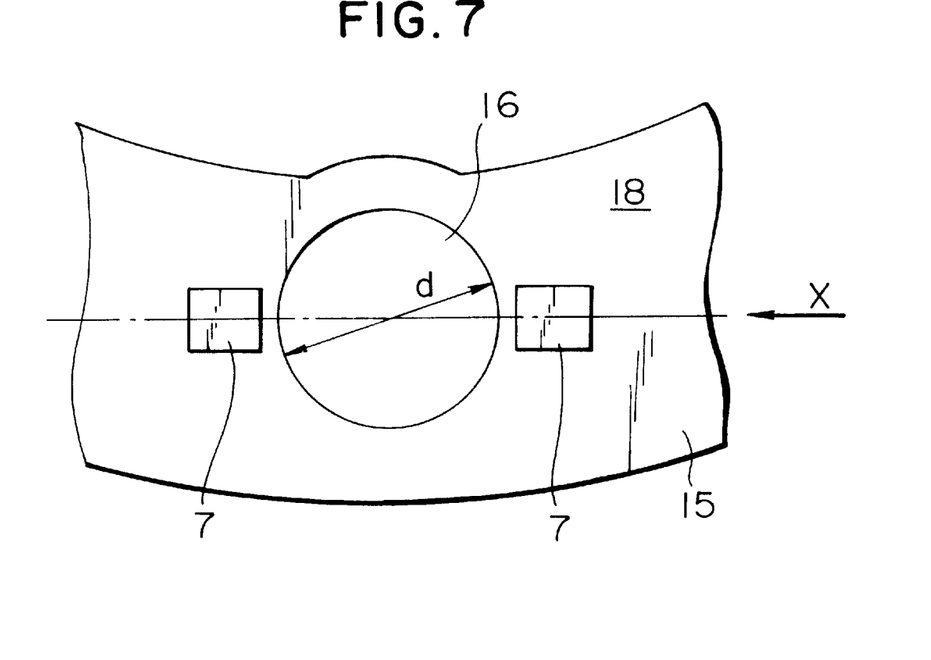
FIG. 7 is an enlarged view of portion D of FIG. 6.
Figure 8:
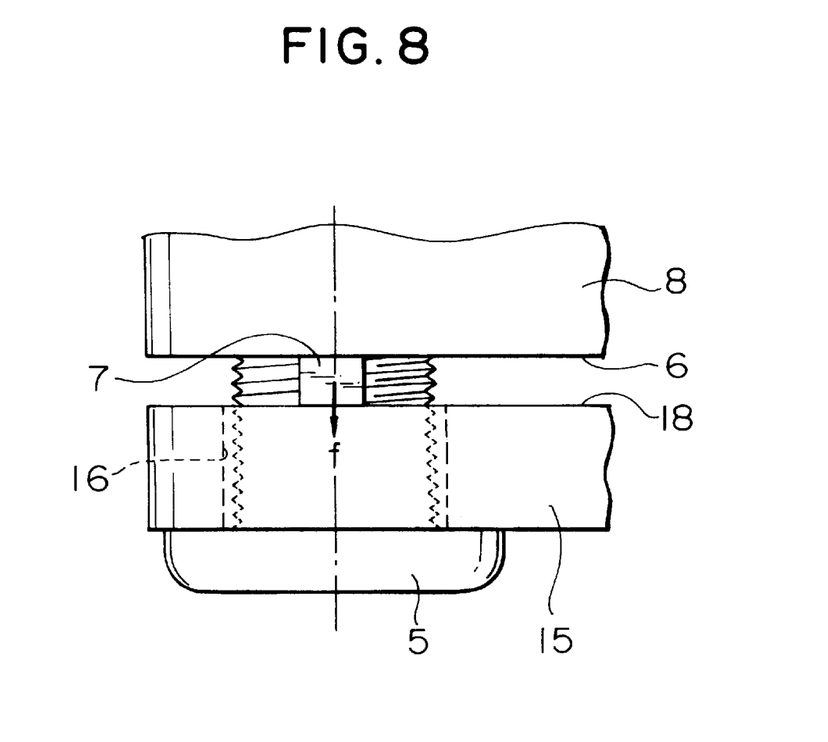
FIG. 8 is a fragmentary side view viewed from the direction of an arrow X in FIG. 7.
Figure 9:
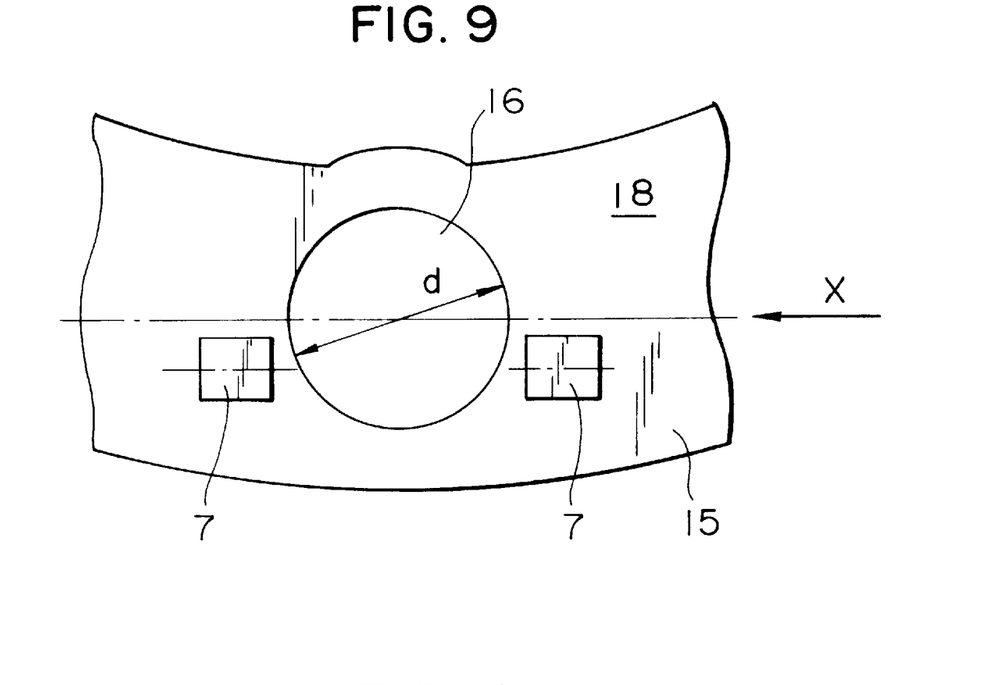
FIG. 9 is a view similar to FIG. 7, but showing a modified form of the embodiment.
Figure 10:
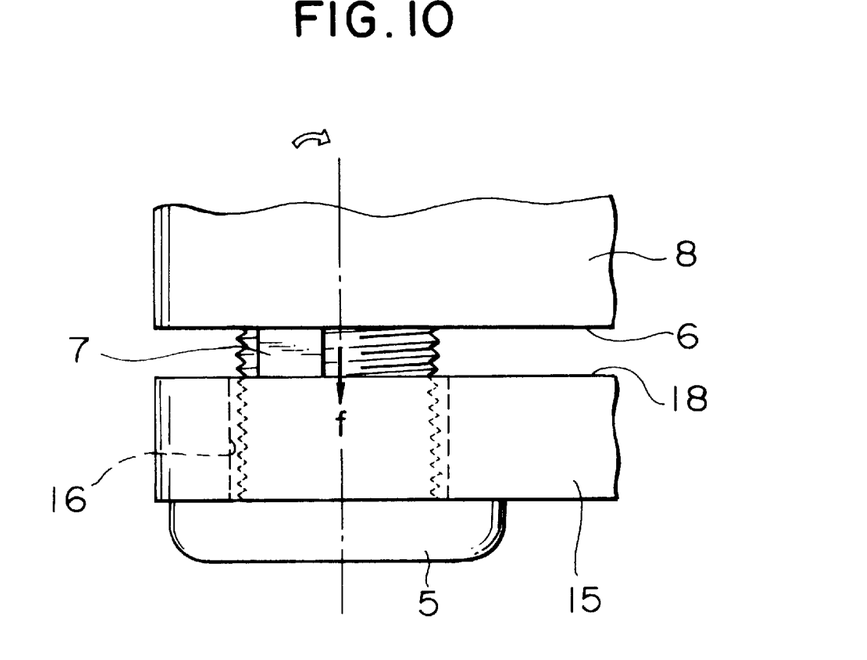
FIG. 10 is a fragmentary side view viewed from the direction of an arrow X in FIG. 9.
Figure 11:
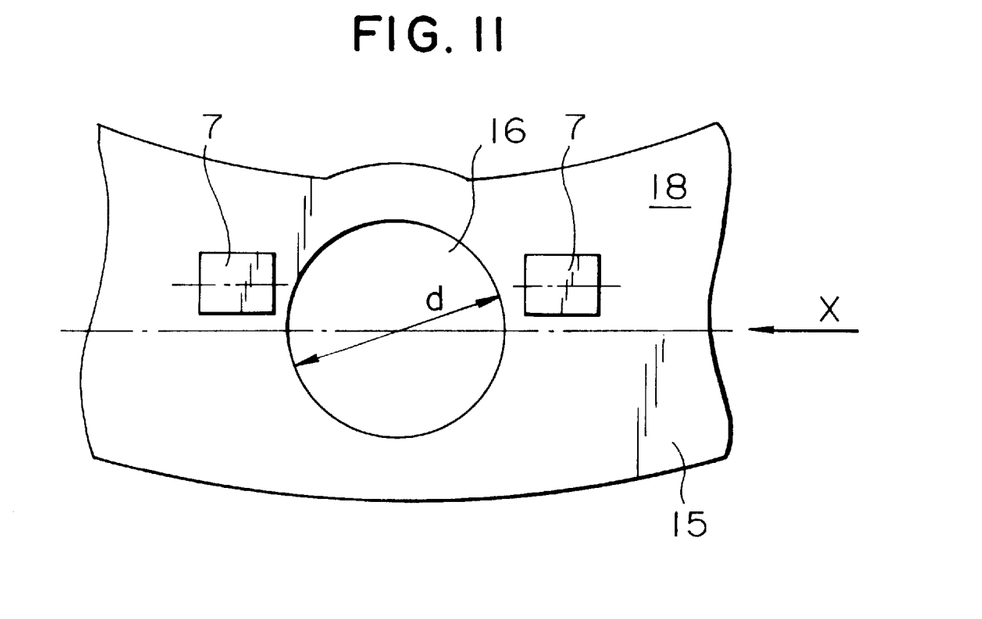
FIG. 11 is a view similar to FIGS. 7 and 9, but showing a further modified form of the embodiment.
Figure 12:
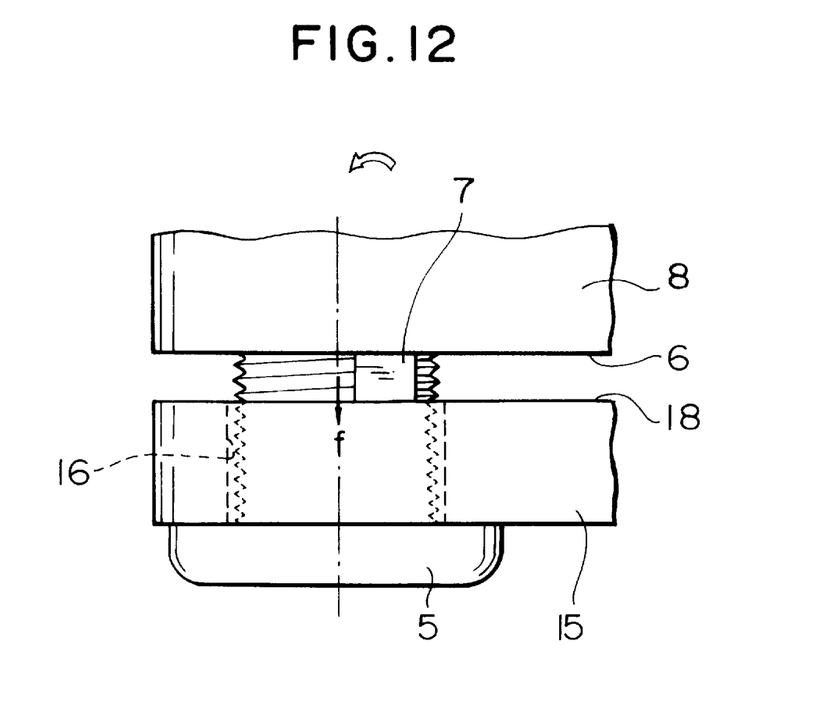
FIG. 12 is a fragmentary side view viewed from the direction of an arrow X in FIG. 11.

With reference to FIGS. 6–12, a first embodiment of a drum base of the invention will be described. The drum base 15 comprises a substantially annular frame 21 having a fixing surface 18, to which a lower drum 8 of a magnetic tape recorder is fixed. The frame 21 is formed with three holes 16 extending through the fixing surface 18. As shown in FIG. 8, a screw 5 passes through each hole 16, and engages with a threaded hole (not shown) formed in the bottom of the lower drum 8.

A pair of seats 7 on which the lower drum 8 is mounted are formed on the fixing surface 18 near each hole 16. It should be noted that the terms "circumferential direction" and "radial direction" used hereinafter respectively denote a circumferential direction and a radial direction of the annular frame 21. Each pair of seats or mounting surfaces 7 are arranged symmetrically with respect to the associated hole 16 in a circumferential direction. Each seat 7 is so sized and located in the radial direction that it is within a range of a dimension of a diameter of the hole 16.

In the structure shown in FIGS. 7 and 8, the seats 7 are located so that their centerlines extending in the circumferential direction coincide with a centerline, in the circumferential direction, of the through hole 16. In the structure shown in FIGS. 9 and 10 the seats 7 are located radially outwardly from the centerline, in the circumferential direction, of the through hole 16. In the structure shown in FIGS. 11 and 12, the seats 7 are located radially inwardly from the centerline, in the circumferential direction, of the through hole 16.

The lower drum 8 is fixed to the drum base 15 by mounting its bottom 6 on the seats 7 and tightening the screws 5 through the holes 16 into the threaded holes in the bottom 6 (not shown). As described above, the seats 7 are located within the range of the dimension of the diameter of the holes 16 in the radial direction. Therefore, even if a projection is formed on the seat 7, a distance in the radial direction between the projection and a center of the associated screw 5 is small. Accordingly, a component in the radial direction of a bending moment due to the tightening force f of the screw 5 is small. As a result, the lower drum 8 cannot be locally deformed in the radial direction.

Meanwhile, the pair of seats 7 are arranged symmetrically with respect to the associated hole 16 in the circumferential direction and outwardly from the diameter of the hole 16. Accordingly, a component in the circumferential direction of the bending moment is larger than the component in the radial direction of the bending moment. The lower drum 8, however, has large rigidity in the circumferential direction due to the existence of its peripheral wall (22 in FIG. 4). As a result, the lower drum 8 cannot be locally deformed in the circumferential direction. Therefore, the lead 3 of the lower drum 8 cannot be distorted.

The structures shown in FIGS. 7 to 10 in which the centerlines of the seats 7 extending in the circumferential direction coincide with a centerline, in the circumferential direction, of the through hole 16 or the seats 7 are located radially outwardly from the centerline, in the circumferential direction, of the through hole 16 are preferable from the view point of preventing the drum from being floated, because the component in the radial direction of the bending moment acts to urge the lower drum 8 against the fixing surface 18.

In order to reduce possibility of the formation of projection, it is preferable that the top area of the pair of seats 7 is smaller. If the area is too small, however, the tightening force may break the seat 7, so that the lower drum 8 may be locally deformed.

Figure 13:
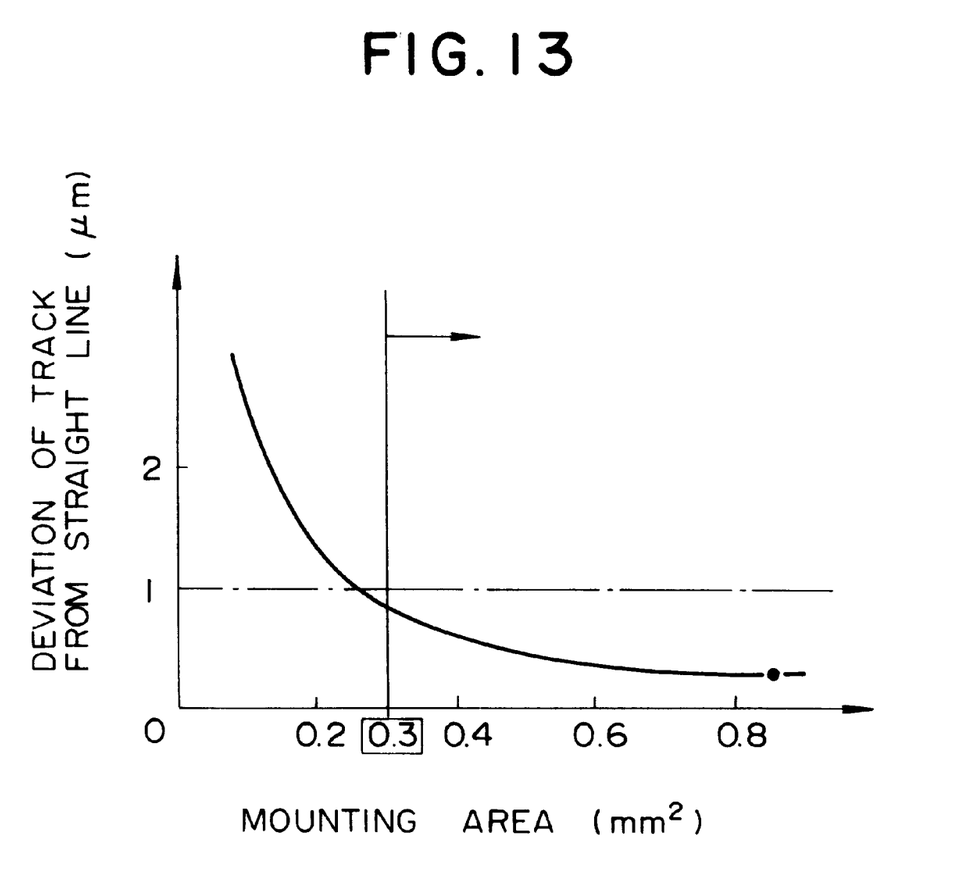
FIG. 13 is a graph showing a relation between an areas of drum-mounting surfaces and the deviations of recorded tracks from a straight line.

In experiments, a lower drum 8 was fixed to each of drum bases 15, which were aluminum die-castings, with screws 5 each tightened at a torque of 0.5 Kg·cm. The bases 15 had seats 7 of different top areas, respectively. FIG. 13 shows the relations between the seat top areas and the deviations of the recorded track patterns each from the straight line. Provided that the practically negligible deviation of the track patterns from the straight line is 1 $\mu$m or less, it is preferable that the total top area of a pair of seats 7 be 0.3 mm$^2$ or more.

In the above embodiment, the lower drum 8 is fixed to the drum base 15 with the three screws 5. In addition, one pair of seats 7 are formed near each hole 16. It should, however, be understood that the present invention is not limited to the embodiment.

Figure 14:
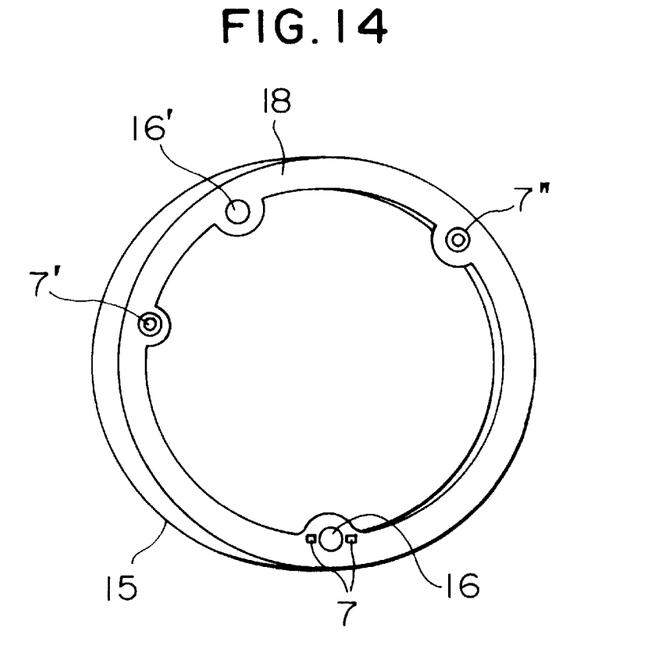
FIGS. 14 and 15 are each a plan view of other embodiment of the drum base according to the invention.

A drum base 15 shown in FIG. 14 has two through holes 16 and 16'. A pair of seats 7 are formed near the hole 16 only.

Seats 7' and 7" in the form of truncated cones are located away from the holes 16 and 16'.

Figure 15:
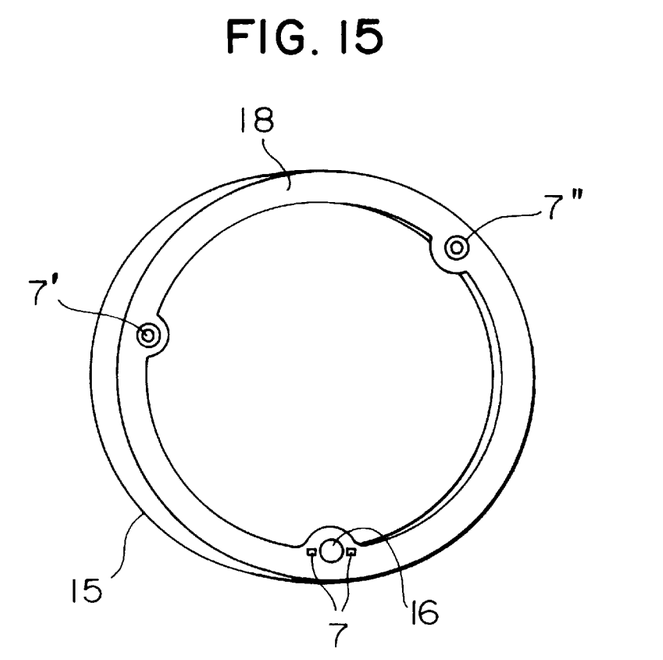

A drum base 15 shown in FIG. 15 has a through hole 16, a pair of seats 7 near the hole 16, and seats 7' and 7" in the form of truncated cones. The hole 16 and the associated pair of seats 7 are located nearly in the middle location of the portion of a magnetic tape wound on the drum 4. This location is one affecting the local deformation of the lead 3 of the lower drum 8 most. If the tape is wound on the drum by an angle of about 180°, it is practically sufficient to merely form in this location a through hole and a pair of seats according to the invention.

What is claimed is:

1. A drum base on which a drum of a magnetic tape recorder is mounted, comprising:

a substantially annular frame having a drum opposing surface;

at least one through hole extending through said drum opposing surface for allowing a screw which is to be threadably attached to a threaded hole formed in the drum to pass therethrough; and a pair of mounting seats provided on said drum opposing surface on which the drum is mounted, said mounting seats being located adjacent to said at least one through hole and being symetrically disposed on opposite sides of said at least one through hole as defined in a circumferential direction of said annular frame, and being disposed within a range defined between an inner-most diameter and an outer-most diameter of said at least one through hole as measured in a radial direction from a center of said annular frame.

2. A drum base according to claim 1, wherein said pair of mounting seats are located such that centerlines thereof extending in a circumferential direction of said annular frame and dividing an area of each seat into two equal areas substantially coincide with a centerline of said at least one through hole extending in said circumferential direction.

3. A drum base according to claim 1, wherein said drum base more specifically comprises two through holes, and said pair of mounting surfaces are provided adjacent only one of said two through holes.

4. A drum base according to claim 2, wherein said drum base more specifically comprises two through holes, and said pair of mounting surfaces are provided adjacent only one of said two through holes.

5. A drum base according to claim 1, wherein said drum base more specifically comprises three through holes, and separate pairs of mounting surfaces are respectively provided adjacent to all three said through holes.

6. A drum base according to claim 2, wherein said drum base more specifically comprises three through holes, and separate pairs of mounting surfaces are respectively provided adjacent to all three said through holes.

7. The drum base of claim 1, wherein said annular frame is an aluminum die-cast frame, and a total area of said pair of mounting surfaces is 0.3 mm$^2$ or more when a fixing torque of said screw is 0.5 Kgcm.

8. The drum base of claim 2, wherein said annular frame is an aluminum die-cast frame, and a total area of said pair of mounting surfaces is 0.3 mm$^2$ or more when a fixing torque of said screw is 0.5 Kgcm.

9. The drum base of claim 3, wherein said annular frame is an aluminum die-cast frame, and a total area of said pair of mounting surfaces is 0.3 mm$^2$ or more when a fixing torque of said screw is 0.5 Kgcm.

10. The drum base of claim 4, wherein said annular frame is an aluminum die-cast frame, and a total area of said pair of mounting surfaces is 0.3 mm$^2$ or more when a fixing torque of said screw is 0.5 Kgcm.

11. The drum base of claim 5, wherein said annular frame is an aluminum die-cast frame, and a total area of said pair of mounting surfaces is 0.3 mm$^2$ or more when a fixing torque of said screw is 0.5 Kgcm.

12. The drum base of claim 6, wherein said annular frame is an aluminum die-cast frame, and a total area of said pair of mounting surfaces is 0.3 mm$^2$ or more when a fixing torque of said screw is 0.5 Kgcm.

* * * * *